Figure 4:
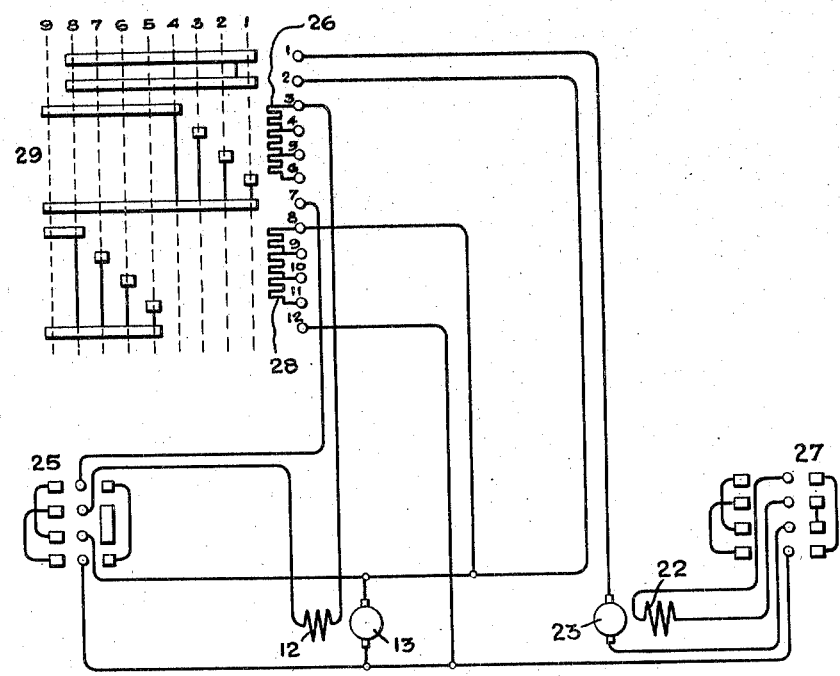

H. W. STOCK.
LOCOMOTIVE.
APPLICATION FILED MAY 15, 1919.
1,312,216.
Patented Aug. 5, 1919.
2 SHEETS—SHEET 1.
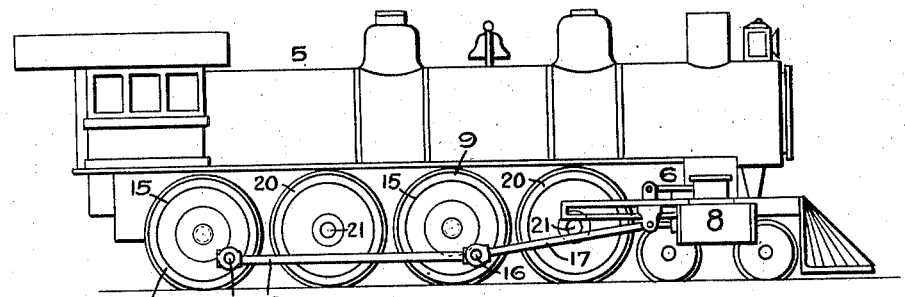
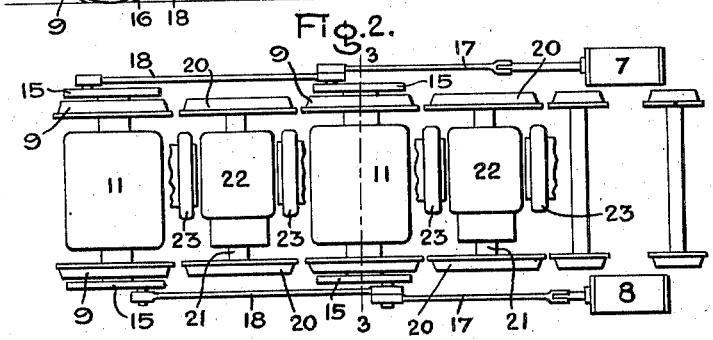
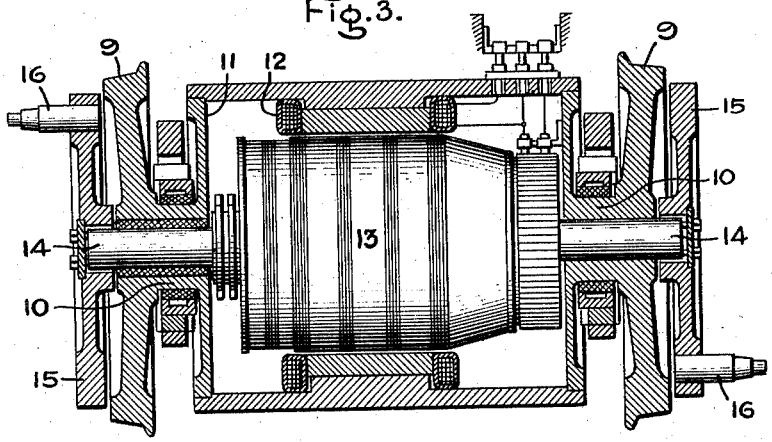
Inventor:
Henry W. Stock,
by
His Attorney.

UNITED STATES PATENT OFFICE.

HENRY W. STOCK, OF ERIE, PENNSYLVANIA, ASSIGNOR TO GENERAL ELECTRIC COMPANY, A CORPORATION OF NEW YORK.

LOCOMOTIVE.

1,312,216.  Specification of Letters Patent.  Patented Aug. 5, 1919.

Application filed May 15, 1919. Serial No. 297,298.

*To all whom it may concern:*

Be it known that I, HENRY W. STOCK, a citizen of the United States, residing at Erie, county of Erie, State of Pennsylvania, have invented certain new and useful Improvements in Locomotives, of which the following is a specification.

The present invention relates to locomotives and has for its object to provide an improved arrangement for transmitting power from the engine which forms a part of the locomotive to the driving wheels. The engine may be any suitable form of primary source of power such as a steam engine, or a gas or fuel oil engine, and it is to be understood that by the term engine as used herein I mean any such type of engine as may be found best suited to any particular case.

For a consideration of what I believe to be novel and my invention, attention is directed to the accompanying description and the claims appended thereto.

In the drawing, Figure 1 is an outline in side elevation of a locomotive embodying my invention; Fig. 2 is a plan view of the running gear; Fig. 3 is a section taken on line 3—3, Fig. 2; and Fig. 4 is a diagram of controller connections.

Referring to the drawing, 5 indicates a locomotive, and 6 an engine mounted thereon for driving it, such engine being shown in the present instance in the form of steam cylinders 7 and 8 mounted on opposite sides of the locomotive. Such cylinders may be, however, gas or oil engine cylinders.

Now, according to my invention, I mount the driving wheels 9 of which there may be any suitable number of pairs, on short, hollow axles 10 and the axles 10 of each pair are connected together by a housing or frame 11 which carries a field winding 12 and forms the field member of an electric generator. The armature member of such generator is indicated at 13 and is carried by a shaft 14 the ends of which pass through the hollow axles 10 and carry driving disks or cranks 15. On the driving disks or cranks 15 are pins 16 to which are connected connecting rods 17 of the engine. In the present instance two pairs of driving wheels 9 are shown, and both are of the structure illustrated in Fig. 3 and have their disks or cranks 15 connected in tandem by connecting rods 17 and links 18 to cylinders 7 and 8. The engine cylinders 7 and 8, it will be clear, do not drive directly wheels 9 but drive the armature members 13. Adjacent driving wheels 9 are pairs of wheels 20 carried by axles 21 and mounted on axles 21 are the armature members 22 of suitable motors, the field members 23 of which are mounted on stationary parts of the running gear. In the present instance two pairs of wheels 20 having motors associated with their axles are shown.

The mode of operation of my invention will be understood from Fig. 4 wherein I have shown diagrammatically the circuit connections for one generator and motor. The generator comprising armature member 13 and field member 12 may be of the series wound type and is provided with a reversing switch 25 and a field resistance 26. The motor comprising armature member 23 and field member 22 may be of the series wound type also, and is provided with a reversing switch 27 and a field resistance 28. A suitable controller is indicated at 29.

When it is desired to propel the locomotive the engine is started with the result that the generator armatures 13 are driven at a suitable speed; the locomotive, however, will not move as no tractive effect is given to either wheels 9 or 20 as long as the circuit connections are open as shown in Fig. 4. The controller 29 is now moved to position 1. This connects the generator to the motor through contacts 1 and 2 and closes the generator field through contacts 6 and 7, the resistance 26 being put in series with field winding 12. The generator now generates a current which is fed to the motor to start the locomotive. At the same time, the revolving generator armature exerts a drag on the generator field 12 which also helps to start the locomotive. Since resistance 26 is in series with generator field 12, the field will be comparatively weak and the current generated of low voltage. Hence the locomotive will start to move slowly and smoothly. The controller is now turned successively to points 2, 3 and 4 with the result that the generator field resistance is gradually cut out thus increasing the generator field strength and as a result increasing the voltage of the current fed to the motor and also the magnetic drag of the generator armature 13 on the generator field 12. As the locomotive gains headway the relative difference in speed between the generator field and armature decreases with the result that the amount of current fed to the motor decreases. After the controller reaches position 4 resistance 26 is entirely cut out and the generator is short circuited on itself. This results in magentically locking the generator field and armature together so that eventually the generator field 12 will travel at the same speed as the armature 13 minus the slip between them. The controller is next moved to point 5 with the result that the motor is short circuited through contact 12, resistance 28 and contact 8, and as the controller is moved successively to points 6, 7 and 8, the resistance 28 is gradually cut out and finally at point 9, the motor is open circuited at contacts 1 and 2 and the drive is entirely through the generators which are magnetically coupled together.

With the above described arrangement, the engine can be run always at an efficient speed and need not be stopped when the locomotive stops. This saves time in stopping and starting and insures quick, even acceleration as the engine can be running at a good speed before starting. Furthermore, in climbing grades the speed of the engine need not be decreased even though the locomotive speed becomes quite slow for at such times it is only necessary to move the controller to a point where current is fed from the generators to the motors when the relative speeds may become anything desired.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. In a locomotive, an engine, a pair of wheels, a generator comprising a frame having a field winding thereon and an armature, said frame connecting said pair of wheels together, a shaft for the armature, means connecting the engine to said shaft, a second pair of wheels, a motor mechanically connected to said second pair of wheels, and means electrically connecting the generator to the motor.

2. In a locomotive, an engine, a pair of wheels, a generator comprising a frame having a field winding thereon and an armature, said frame connecting said pair of wheels together, a shaft for the armature, means connecting the engine to said shaft, a second pair of wheels, a motor mechanically connected to said second pair of wheels, and a controller and circuit connections whereby the generator may be electrically connected to the motor, or said generator may be short circuited and said motor open circuited.

3. In a locomotive, an engine comprising cylinders mounted on opposite sides thereof, pairs of wheels, a generator comprising a field frame having a winding thereon and an armature, one of said pairs of wheels being connected to said frame, a shaft for said armature, means connecting said cylinders to the shaft to rotate it, a motor mechanically connected to another of said pairs of wheels, and a controller and circuit connections for electrically connecting the generator to the motor or for short circuiting the generator and open circuiting the motor.

4. In a locomotive, an engine comprising cylinders mounted on opposite sides thereof, pairs of wheels, a generator comprising a field frame having a winding thereon and an armature, said field frame having projecting stub axles with openings therethrough, one of said pairs of wheels being connected to said stub axles, a shaft for said armature which extends through said stub axles, crank means on the ends of said shaft, a motor mechanically connected to another of said pairs of wheels, and a controller and circuit connections for electrically connecting the generator to the motor, or for short circuiting the generator and open circuiting the motor.

5. In a locomotive, an engine, a plurality of pairs of wheels, a generator comprising a frame having a field winding thereon and an armature associated with each pair of wheels, each frame connecting a pair of wheels together, a shaft for each armature, means connecting the engine to said shafts, a second plurality of pairs of wheels, a motor mechanically connected to each of said second pairs of wheels, and a controller and circuit connections whereby the generators may be electrically connected to the motors or said generators may be short circuited and said motors open circuited.

In witness whereof I have hereunto set my hand this 13th day of May, 1919.

HENRY W. STOCK.